United States Patent [19]

Kampf et al.

[11] Patent Number: 4,479,054

[45] Date of Patent: Oct. 23, 1984

[54] SCINTILLATION COUNTER LIGHT SEAL

[75] Inventors: Richard S. Kampf, Costa Mesa, Calif.; Henry G. Dowling, Atlanta, Ga.

[73] Assignee: Beckman Instruments, Inc., Fullerton, Calif.

[21] Appl. No.: 328,341

[22] Filed: Dec. 7, 1981

[51] Int. Cl.³ .............................................. G01T 7/08
[52] U.S. Cl. .................................................... 250/328
[58] Field of Search .................. 250/328, 453.1, 455.1, 250/223 B; 356/244

[56] References Cited

U.S. PATENT DOCUMENTS

| | | | |
|---|---|---|---|
| 3,163,756 | 12/1964 | Meeder et al. | 250/71.5 |
| 3,198,948 | 8/1965 | Olson | 250/328 |
| 3,270,202 | 8/1966 | Long et al. | 250/71.5 |
| 3,905,453 | 9/1975 | Frank . | |
| 3,919,554 | 11/1975 | Frank . | |
| 3,924,128 | 12/1975 | Frank | 250/328 |
| 4,122,936 | 10/1978 | Johnson . | |
| 4,220,855 | 9/1980 | Johnson | 250/328 |
| 4,242,582 | 12/1980 | Kampf . | |
| 4,244,458 | 1/1981 | Kampf | 198/339 |

Primary Examiner—Alfred E. Smith
Assistant Examiner—T. N. Grigsby
Attorney, Agent, or Firm—W. H. May; P. R. Harder; S. R. Markl

[57] ABSTRACT

An assembly for sealing the access passageway to a detector chamber in a scintillation counter instrument. The seal is designed to prevent the entry of any exterior light or environment that could affect the counting or scintillation process when a sample is positioned in the detector chamber. The sealing mechanism operates in conjunction with the scintillation instrument's flexible transport or elevator mechanism that moves a sample containing vial into the detector chamber. A plurality of rotating blades engage the elevator mechanism to form the tight seal. Included in the arrangement is a redundant system to provide a dual sealing capability. The sealing mechanism operates in conjunction with the flexible transport member which allows itself to be centered by the sealing mechanism to achieve the required light seal.

11 Claims, 4 Drawing Figures

SCINTILLATION COUNTER LIGHT SEAL

BACKGROUND OF THE INVENTION

The present invention is directed to liquid scintillation devices and, more particularly, is directed to a light seal mechanism for use in a liquid scintillation device.

In the normal operation of liquid scintillation, a plurality of sample carrying vials which include radioactive material are transferred sequentially into a shielded detector or counting chamber wherein light flashes or scintillations produced by photons being emitted from the radioactive samples can be reliaby detected by photomultiplier tubes or other sensing means in the detector chamber. To achieve accurate measurement the counting chamber must be properly secured and sealed to prevent the entry of any exterior environment. The entry of any exterior light would affect the sensitive and accurate counting done in the detector chamber.

Therefore, the entry port or passageway to the detector chamber must have some type of mechanism to properly seal the chamber while the counting operation is occurring with the particular sample carrying vial in the chamber.

Some prior approaches have been utilized, such as shown in U.S. Pat. No. 4,220,855 wherein a rotatable ring member or cylindrical member is designed to rotate and slip beneath the bottom of the sample vial, once it is in the chamber, and seal the passageway. The system appears to be somewhat complicated and may result in possible jamming when moving between the vial and the elevator mechanism.

Other prior art scintillation counters having means for excluding ambient light from the counting chamber are disclosed in U.S. Pat. Nos. 3,270,202 and 3,163,756 which are discussed in the above referenced U.S. Pat. No. 4,220,855.

It is important with respect to the provision of a light seal for use in conjunction with a counter chamber that the mechanism be not only simplified in its operation, but also reliable in its operation. It should be noted that the light seal mechanism will be operated repetitively numerous times while a group of sample containing vials are automatically sequenced into the detector chamber for measurement.

SUMMARY OF THE INVENTION

The present invention is directed to a light seal mechanism utilizing movable restricting means designed to engage a portion of the elevator mechanism and seal the passageway to the detector chamber. Included in the elevator mechanism is a resilient or soft contact end which carries the sample vial. This portion of the elevator mechanism resides adjacent the light seal when the sample carrying vial is in the detector chamber. A control mechanism is utilized to move the restricting means into engagement with the soft resilient elevator portion of the mechanism to provide the tight seal.

Redundant sets of sealing members are utilized in spaced vertical orientation with respect to the elevator mechanism to ensure accurate and proper sealing of the passageway to the detector chamber.

The set of sealing members close to the detector chamber are coated with a reflective material so that any light being reflected toward the passageway from the radioactive sample is directed back into the detector chamber. The lower set of seal members are dark coated to minimize internal reflections.

The sealing members of the present invention will automatically aign the flexible transport member of the elevator system if it is not in its proper position.

DETAILED DESCRIPTION OF THE INVENTION

In liquid scintillation and in gamma counter devices a radioactive material is chemically bonded or mixed with the sample under investigation. Important to the determination of certain characteristics of the sample is the rate or amount of radioactive decay occurring in the sample containing vial or tube. This process of determining the radioactive decay is accomplished in a detector chamber within a liquid scintillation or in a gamma counter device. The measurement determined by a liquid scintillator, for example, is based on the counting of scintillations or light flashes which are very small and cannot be seen by the naked eye. Therefore, it is necessary to utilize sensitive photomultiplier devices in the detector chamber. Also, in order to accomplish an accurate count in the detector chamber, it must be sealed in such a manner that no exterior background light affects the count taken by the photomultiplier. The present invention, as discussed previously, is directed to a mechanism for providing a light seal adjacent the entry area of the sample containing vial into the detector chamber.

Figure 1:
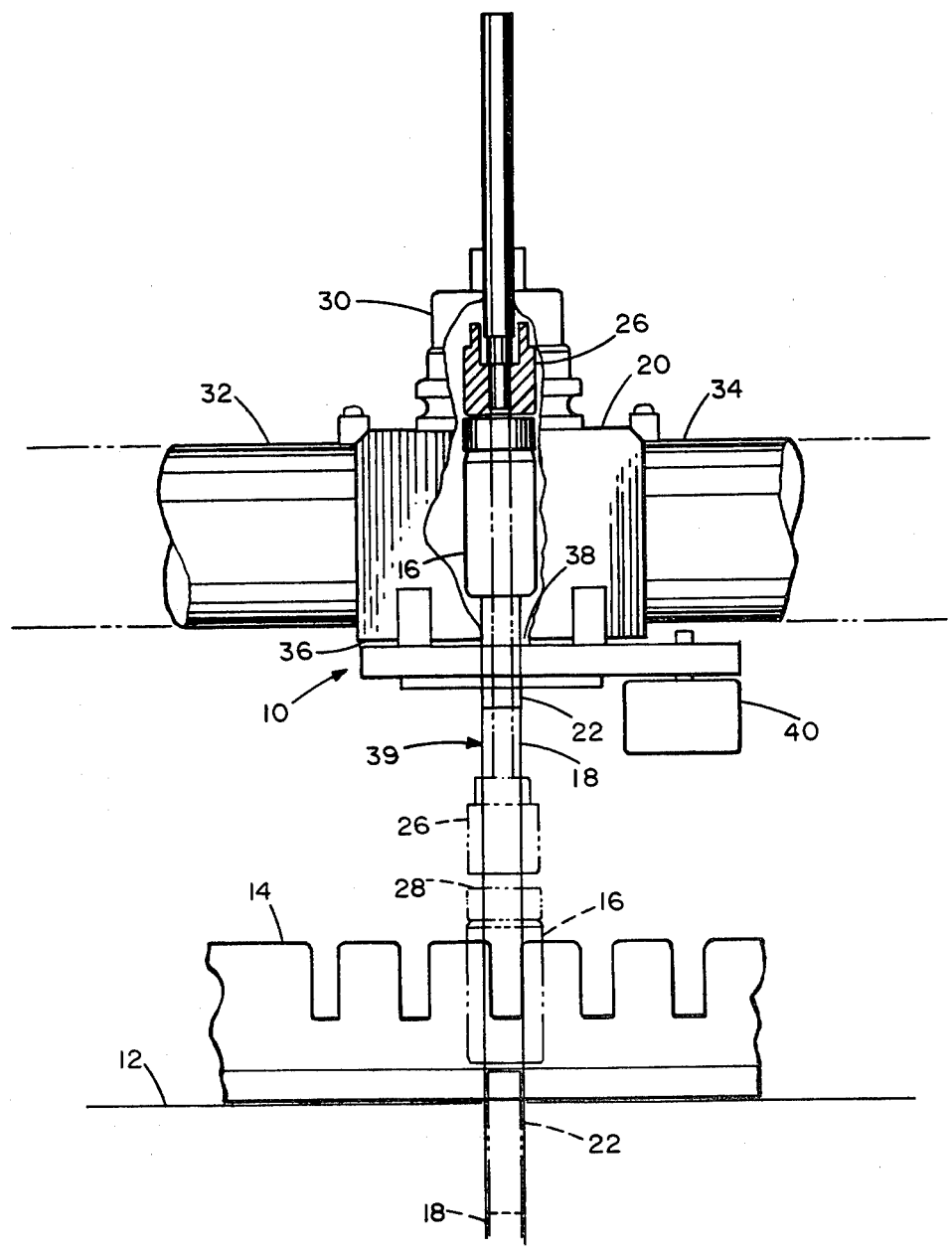
FIG. 1 is an elevational view of the present invention showing its location within a liquid scintillation arrangement.

In FIG. 1, portions of a liquid scintillation arrangement are shown in conjunction with the operation of the light seal 10 of the present invention. Located on a transport platform 12 in the liquid scintillation device are several racks 14 which carry a plurality of sample containing vials 16. Located below the platform 12 is an elevator transport mechanism 18 which is designed to move the vial from the rack 14 up into the detection chamber 20. Reference is made to copending patent application entitled A Sample Container Elevator Mechanism, Ser. No. 328,342 filed on Dec. 7, 1981 in the name of Richard S. Kampf and assigned to the same assignee as the present application. This referenced application explains in more detail the operation of the elevator transport member 18.

It should be noted that on the tip or end 22 of the elevator transport member is a soft rubber or other resilient type material that is designed to engage the bottom 24 of the vial 16. Located just above the vial when it is in its position as shown in phantom in the rack 14, is a stabilizer weight 26 which is designed to contact the top of a vial 28 and provide stability as it is lifted from its position in the rack 14 to its position within the detector chamber 20. The above referenced patent application explains in more detail the weighted member 26 and its operation including its retraction into the stabilizer housing 30. It should be noted that in the operation of the liquid scintillator the rack 14 is automatically indexed from one position on the platform 12 to the next after the liquid scintillation has been accomplished in the detector chamber and the vial is returned to the rack.

Once the vial is located in the detector chamber 20, it is important that the photomultipliers 32 and 33 accurately sense the amount of radioactive decay occurring from the radioactive material and sample in the vial. However, since the elevator transport member 18 must remain in the detector chamber in order to support the vial, some mechanism must be utilized to provide a seal around the elevator transport mechanism 18 so that no exterior light can enter into the detector chamber and destroy the meaningful measurement being accomplished.

The present invention is directed to a light seal 10 which is located adjacent the bottom 36 of the detector chamber near the entry 38 to the chamber 20 and next to the passageway 39 along which the vial 16 passes for entry into the chamber 20. The concept of the present invention is the movement of a valving mechanism which in one position opens wide enough to allow the passage of the vial 16, but in a second position closes in light engagement with the transfer mechanism 18 to prevent the entry of any light. As indicated previously, the resilient rubber tip 22 on the transfer mechanism is designed to operate in conjunction with the light seal 10 that closes when the vial is in place in the detection chamber. The operation of the valving arrangement in the light seal end is accomplished by a drive motor 40.

Figure 2:
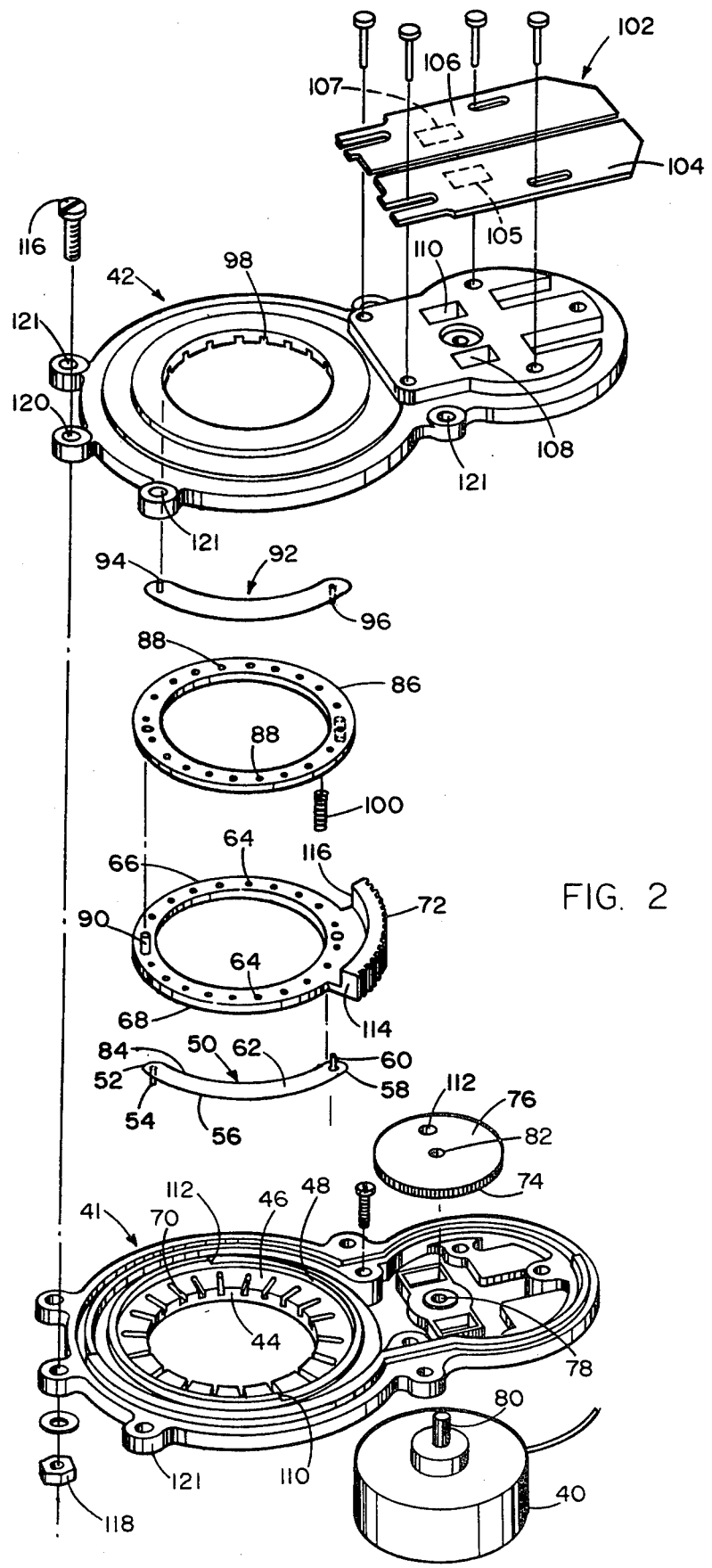
FIG. 2 is an exploded perspective view of the present invention.

With respect to more detail of a preferred form of the light seal 10, attention is directed to FIG. 2. The light seal 10 includes two separate identical lower and upper housing portions 41 and 42. The lower housing portion 41 has an opening 44 which is designed to allow the passage of a vial 16 from the rack 14 in FIG. 1 to the detector chamber 20. Located around the periphery of the opening 44 in FIG. 2 is a ledge 46 which is bounded by the opening 44 and a vertical ridge 48.

Positioned in overlapping arrangement on the ledge 46 are a plurality or set of sealing members or blades 50 having an arcuate shape designed to conform with the circumference of the vertical ridge 48. At one end 52 of the blade 50 is a slide pin 54 which is projecting from the underside surface 56 of the blade while at the other end 58 of the blade 50 is an anchoring pin 60 which projects from the top surface 62 of the blade 50. The anchoring pin 60 is designed for insertion into a pin aperture 64 located in a drive ring 66. A plurality of closure members or blades 50 are positioned around the drive ring 66 with each respective anchoring pin 60 placed within respective adjacent anchoring pin holes 64. The circumference of the drive ring 66 is such that it mates with the arcuate shape of each of the blades 50.

In the preferable embodiment, approximately twenty blades 50 are connected in overlapping arrangement around the bottom surface 68 of the drive ring 66. The drive ring 66 with the blades 50 is placed on the ledge 46 in the lower housing portion 41 of the light seal 10. The slide pins 54 on each of the blades 50 are designed to be received in respective radial slots 70 located in the ledge 46. Because the drive ring 66 is not affixed to the lower housing portion 41, any arcuate moving of the drive ring 66 will cause the respective blades to swing out in overlapping fashion toward the center of the opening 44. Each blade 50 covers approximately 135° on the circular ledge 46. However, each blade 50 has a length shorter than the diameter of the opening 44. Therefore, as the pivot end 58 of the blade is moved 90°, as will be explained, the slot 70 must be long enough to accommodate the difference in the blade length and the diameter of the opening 44. This is because the ends of the blade will rotate through the diameter of the opening 44 where the ends 52 and 58 at one point will be 180° with respect to each other. If different sized blades are used, the slots must be designed to accommodate the blade movement. This operation is somewhat similar to that accomplished by a lens opening device in a camera.

The drive ring 66 has a sector of gear teeth 72 which are designed to engage the gear teeth 74 of the power gear 76. Inserted into an aperture 78 in the housing 42b is a drive shaft 80 from the motor 40. The drive shaft 80 extends through the aperture 78 and connects with the central opening 82 in the power gear 76. Any movement caused by the motor 40 to the power gear 76 will be translated into arcuate movement of the drive ring 66 which, in turn, will operate the movement of the blades 50. When the blades 50 are moved in such a manner that they advance toward the center of the opening 44, they are designed to have their closing edge 81 contact the resilient tip 22 in FIG. 1 of the elevator transport member 18. Since the blades 50 are relatively thin, they tend to somewhat bite into the flexible contact tip 22 to provide an excellent light seal.

In order to provide added assurance of a proper light seal a second set of sealing elements or blades are used. A follower ring 86 in FIG. 2 having a plurality of pin apertures 88 is locked into engagement with the drive ring 66 by the studs 90. A plurality or set of secondary sealing blades 92, having the same arcuate configuration as the first blades 50, are positioned around the circumference of the follower ring 86. Each secondary blade 92 has an anchoring pin 96 which is placed in the respective adjacent pin holes 88 in the follower ring 86 so that all the blades 92 are in overlapping arrangement. The secondary blades 92 have slide pins 94 that are positioned within the slots 98 in the upper housing portion 42. The underside of the upper housing portion 42 in FIG. 2 is the same as that shown with respect to the lower housing portion 41. Therefore, the blades 92 will reside on a ledge in which the slots 98 are positioned. Any movement by the drive ring 66 will move the follower ring 86 and cause the same movement in the secondary blades 92 as with the first blades 50. consequently, two sets of sealing blades 50 and 92 will engage the resilient tip 22 of the elevator mechanism 18 as set forth in FIG. 1.

In order to ensure that the sealing members or blades 50 and 92 remain in their proper position within the respective lower and upper housing portions 41 and 42, a plurality of approximately four biasing springs 100 are placed between the driving ring 66 and the follower ring 86. These springs will tend to force the respective rings apart and against the respective sets of blades 50 and 92.

After the assembly of the lower set of blades 50 with the drive ring 66 as well as the upper set of blades 92 with the follower ring 86, the two identical top and lower housing portions 42 and 41 are joined together and held by a bolt 116 and nut 118 which are positioned in the fastening aperture 120. The remaining apertures 121 receive fastening means to connect the light seal 10 to the detector chamber housing.

In order to properly control the amount of movement of the drive ring 66 as well as the power gear 76, sensing means 102 are positioned adjacent the upper housing portion 42. The sensor mechanism 102 is comprised of two identical circuit boards 104 and 106 which include photosensors 105 and 107 on the under side of the circuit boards. The photosensors fit into the respective windows 108 and 110 in the housing 42. Reference is made to the power gear 76 which is made of a white or reflective colored material such as plastic and has an aperture 112 that is the approximate size of the area of the windows 108 and 110. In operation, the power gear 76 is oriented with respect to the drive ring 66 in such a manner that the opening 112 will be aligned with the window 110 which eliminates the reflective surface in the window 110. The photosensor 107, noting no reflective surface, will send a signal to a system control indicating that the light seal 10 is in the open position which permit removal of the vial through the light seal. After a vial has been placed in the detector chamber, a signal is sent to motor 40 to have the seal close onto the elevator system. The power gear 76 will rotate 180° to the point where the aperture 112 will be in alignment with the other window 108 wherein the photosensor 105 will note no reflective surface and generate a signal to stop the motor 40. It should be noted that the first and second sets of blades 50 and 92 in conjunction with the drive ring 66 and follower ring 86 are designed in such a manner that a 90° rotation of the rings 66 and 86 will provide necessary closure by the blades 50 and 92 to establish the desired seal. However, the diameter of the power gear 76 is one half the diameter of the drive ring 66 with respect to the circumference of the gear portion 72 and, therefore, movement of the power gear 76 must be 180° to provide a 90° movement in the drive ring 66.

The lower and upper housing portions 41 and 42 include stop edges 110 and 112 spaced 180° apart on the circular ridge 48. Contact sides 114 and 116 on the gear sector 72 of the drive ring 66 respectively engage the stop edges 110 and 112 to limit the movement of the drive ring to 90°.

Also included in the circuitry for controlling the operation of the motor 40 is the ability to reduce the torque of the motor when the blades have almost completely closed on the elevator shaft as well as when the blades are almost completely open and recessed within the housing 41 and 42. The blades are preferably made of a relatively thin metal material and could be damaged by high torqued opening and closing. Also the small anchoring pins 60 and 96 on the respective blades sets 50 and 92 may fatigue over repeated use, if the torque was continually high, as the blades moved to the completely closed position and to the completely open position.

Figure 3:
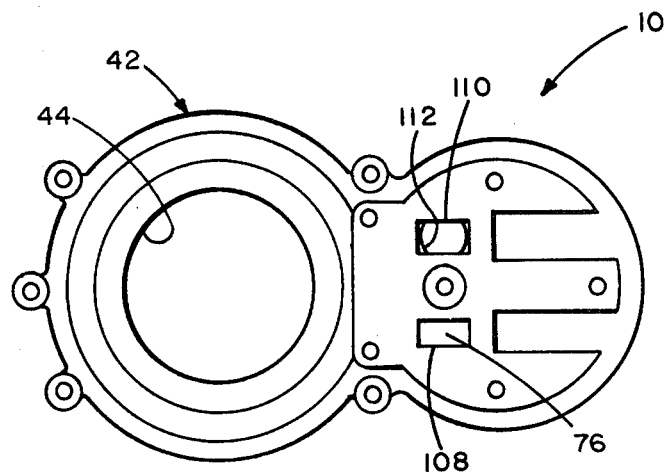
FIG. 3 is a top view of the present invention with the light seal open.
Figure 4:
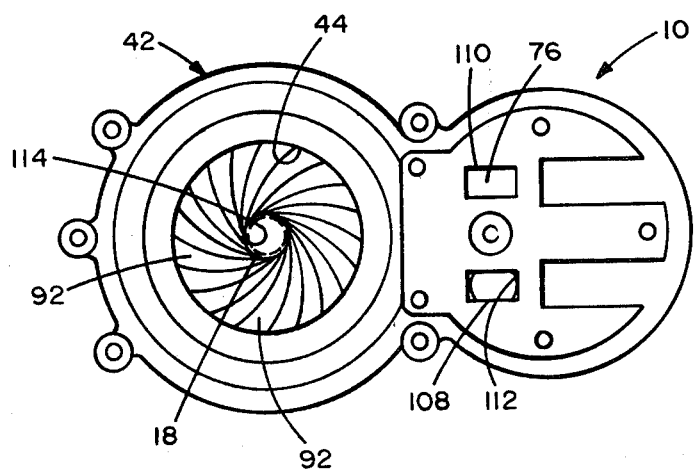
FIG. 4 is a top view similar to FIG. 3 with the light seal in the closed position.

Reference is made to FIGS. 3 and 4 showing the light seal when it is in the completely open position, providing the aperture 44 for the passage of the vial through the light seal as shown in FIG. 3. In FIG. 4, the blades are shown in the cosed position, establishing a smaller aperture 114 which is designed to tightly engage with the soft rubber tip on the elevator mechanism. As the blades 50 close, their contact edges 84 continually overlap and form a continually decreasing circular opening until they engage the transport member 18.

It should be noted with respect to FIG. 2 that the upper set of blades 92 are made of reflective material or coating in order that any light emanating from the sample vial in the detector chamber will be directed back into the detector chamber. However, the lower set of blades 50 are made of a nonreflective or black surface to act as a light sink with respect to any exterior light attempting to enter.

With respect to the operation of the present invention, attention is again directed to FIG. 1 showing the vial rack 14 placed on the transport platform 12. When the vial to be examined is indexed to its proper position, the elevator transport member 18 will move upward so that its contact tip 22 will engage the bottom 24 of the vial 16. The transport member 18 will move the vial vertically upward wherein its top 28 will contact the stabilizer weight 26 which will provide stability to the vial as it moves along its passageway 39 up into the detector chamber 20. Once the vial is in its proper orientation within the detector chamber, a signal is generated to the motor 40 to activate the drive ring 66 in FIG. 2 so that the black set of blades 50 and the reflective set of blades 92 are moved out into the opening 44 and engage the resilient tip 22 on the elevator member 18. This will provide a light seal which is tight to prevent the entry of any exterior environment into the detector chamber.

If the flexible transport member 18 is slightly out of alignment, the blades 50 and 92 will move the transport member into proper alignment to accomplish the desired light seal. This movement of the transport member by the blades 50 and 92 will center the transport member within the aperature 44.

Once the liquid scintillation counting process has been completed, the drive motor will cause the drive ring 66 to rotate 90° to move the respective sets of blades 50 and 92 back into the housing 42 and establish the large opening 44. The elevator transport mechanism 18 will lower the vial through the detector entry 38 and through the light valve opening 44. The vial is returned in a stable manner with the stabilizer member 26 down to the vial rack 14 which is then indexed to the next position so that a new vial can then be lifted into the detector chamber 20 and the process is repeated.

Although in the present invention a plurality of thin arcuate members are shown to provide the light sealing contact with the resilient tip on the elevator mechanism, it is assumed that other configurations or types of closure members could be used to operate in conjunction with the elevator system to create a light seal around the elevator system.

An additional feature with respect to the operation of the present invention is the fact that the light seal 10 in FIG. 1 will automatically center the flexible transport member 18 to its proper location if it is slightly out of alignment when positioning the vial in the detector chamber. When the blades 50 and 92 in FIG. 2 are closed in such a manner as shown in FIG. 4, they will force the flexible elevator to be centered in the overall aperture 44 of the light seal mechanism.

What is claimed is:

1. A measuring apparatus for determining the constituents in a sample containing vial, said apparatus comprising:
   a measuring chamber;
   means for moving said vial into said chamber;
   a passageway along which said vial is moved by said moving means into said chamber; and
   at least one set of a plurality of arcuate blades pivotally mounted in a housing adjacent said passageway and surrounding said passageway adjacent said chamber for adjustably contracting to reduce the cross section of said passageway, and engage an exterior surface of said moving means to block entry of exterior light into said chamber when said vial is in said chamber.

2. A measuring apparatus as defined in claim 1, and additionally comprising a second set of a plurality of arcuate blades mounted in said housing adjacent said passageway.

3. A measuring apparatus as defined in claim 1 wherein said housing is comprised of two identical portions which when joined together form an interior area for receipt of said blades.

4. A measuring apparatus as defined in claim 1, wherein each of said blades comprises a thin flexible member.

5. A measuring apparatus as defined in claim 1, wherein said blades are positioned in overlapping relationship to each other.

6. A measuring apparatus as defined in claim 1 wherein said blades have a reflective surface.

7. A measuring apparatus as defined in claim 1, and additionally comprising means within said housing for pivoting said blades toward and away from the center of said passageway.

8. A measuring apparatus as defined in claim 7, wherein said pivoting means comprises:
 a drive ring mounted within said housing and to which said blades are pivotally connected;
 a power gear in driving communication with said drive ring; and
 means for moving said power gear.

9. A measuring apparatus as defined in claim 7, and additionally comprising means for sensing when said blades are in the open position and the closed position.

10. A measuring apparatus as defined in claim 9, wherein said sensing means comprises at least one photosensor operating in conjunction with said pivoting means.

11. A measuring apparatus for determining the constituents in a sample carrying vial, said apparatus comprising:
 a detector chamber for receipt of a sample containing vial with radioactive material;
 means for detecting light scintillations of said vial within said chamber;
 a passageway to said detector chamber;
 means for moving said vial along said passageway and into said detector chamber; and
 means surrounding said passageway adjacent said detector chamber for adjustably restricting the cross section of said passageway whereby said passageway is blocked by the reduction of the diameter of a generally circular opening in a housing surrounding said passageway, said restricting means engaging said moving means to block entry of exterior light into said detector chamber when said vial is in said detector chamber.

* * * * *